(12) United States Patent
Hungerink et al.

(10) Patent No.: US 7,547,034 B2
(45) Date of Patent: Jun. 16, 2009

(54) FIFTH WHEEL LUBE PLATE HAVING A PERFORATED SUPPORT MEMBER

(75) Inventors: Gerald W. Hungerink, Holland, MI (US); David R. Pernesky, Holland, MI (US)

(73) Assignee: SAF-Holland, Inc., Holland, MI (US)

( * ) Notice: Subject to any disclaimer, the term of this patent is extended or adjusted under 35 U.S.C. 154(b) by 109 days.

(21) Appl. No.: 11/279,682

(22) Filed: Apr. 13, 2006

(65) Prior Publication Data

US 2006/0170191 A1 Aug. 3, 2006

Related U.S. Application Data

(63) Continuation of application No. 10/476,135, filed on Jan. 8, 2004, now Pat. No. 7,036,839.

(60) Provisional application No. 60/286,318, filed on Apr. 25, 2001.

(51) Int. Cl.
*B62D 53/08* (2006.01)
(52) U.S. Cl. ........................ 280/433; 384/421
(58) Field of Classification Search ................ 280/433, 280/434, 438.1, 423.1; 384/421, 909, 907.1, 384/297
See application file for complete search history.

(56) References Cited

U.S. PATENT DOCUMENTS

| | | | |
|---|---|---|---|
| 3,133,722 A * | 5/1964 | McGuire et al. ............ 251/309 |
| 3,174,812 A | 3/1965 | Windmer |
| 3,275,390 A | 9/1966 | Franks |
| 3,704,924 A | 12/1972 | Lowery |
| 3,924,909 A | 12/1975 | Kent et al. |
| 4,121,853 A | 10/1978 | McKay |
| 4,169,635 A | 10/1979 | Szalay et al. |
| 4,457,531 A | 7/1984 | Hunter et al. |
| 4,542,912 A | 9/1985 | St. Louis |
| 4,752,081 A | 6/1988 | Reeners et al. |
| 4,805,926 A | 2/1989 | Mamery |
| 5,066,035 A | 11/1991 | Athans et al. |
| 5,165,714 A | 11/1992 | Kaim |
| 5,263,856 A | 11/1993 | Huehn et al. |
| 5,482,308 A | 1/1996 | Marcu |
| 5,522,613 A | 6/1996 | Heeb |
| 5,620,770 A | 4/1997 | Cork |
| 5,662,767 A | 9/1997 | Cork |
| 5,746,438 A | 5/1998 | Bergmann et al. |

(Continued)

*Primary Examiner*—Kevin Hurley
(74) *Attorney, Agent, or Firm*—Price, Heneveld, Cooper, DeWitt & Litton, LLP

(57) ABSTRACT

The fifth wheel hitch lube plate of the present invention comprises a perforated support member having a plurality of perforations and a lubricious material molded around the perforated support member such that the lubricious material covers both the top and bottom surfaces of the perforated support member and extends through the perforations formed in the perforated support member. Preferably, the support member is a perforated metal plate and the lubricious material is nylon, graphite, or an ultra-high molecular weight (UHMW) polyethylene material. The problems associated with utilizing nylon (or similar materials) and bonding it to a support plate are overcome by forming the plurality of apertures in the support plate so that a mechanical cohesive bond is formed between the upper and lower surfaces of the support plate, thereby substantially increasing the lube plate strength, and shear strength, while decreasing the likelihood that the lube plate may buckle.

11 Claims, 6 Drawing Sheets

U.S. PATENT DOCUMENTS 6,010,141 A    1/2000  Huntimer et al.
6,045,148 A    4/2000  Baumeister
6,371,504 B1   4/2002  Alguera Gallego et al.

* cited by examiner

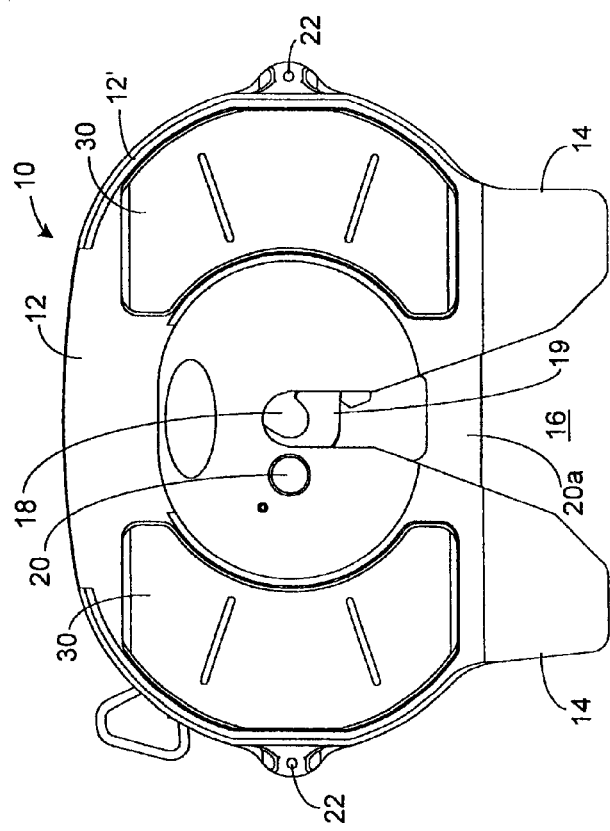
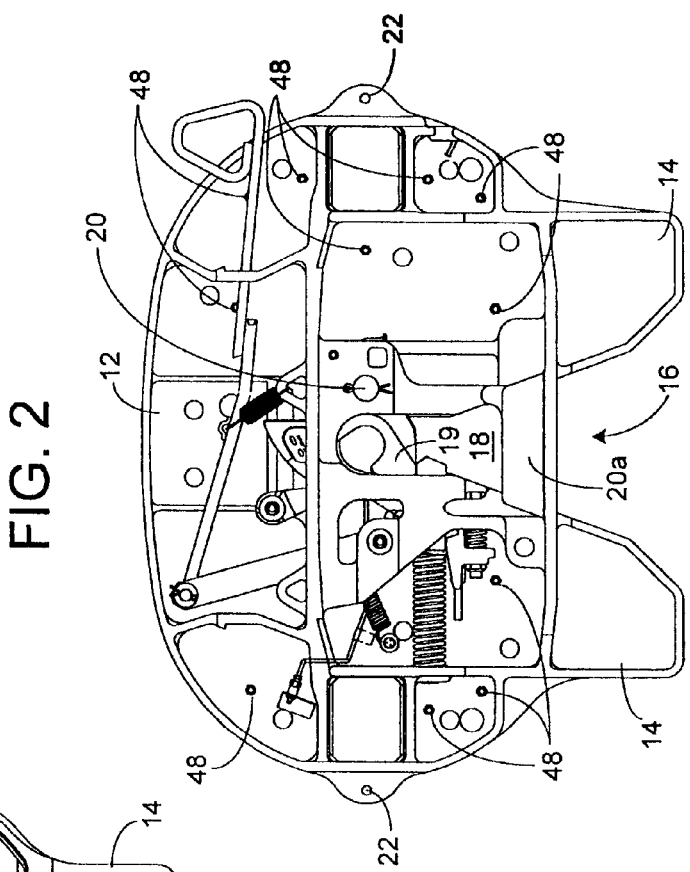
FIG. 1
FIG. 2

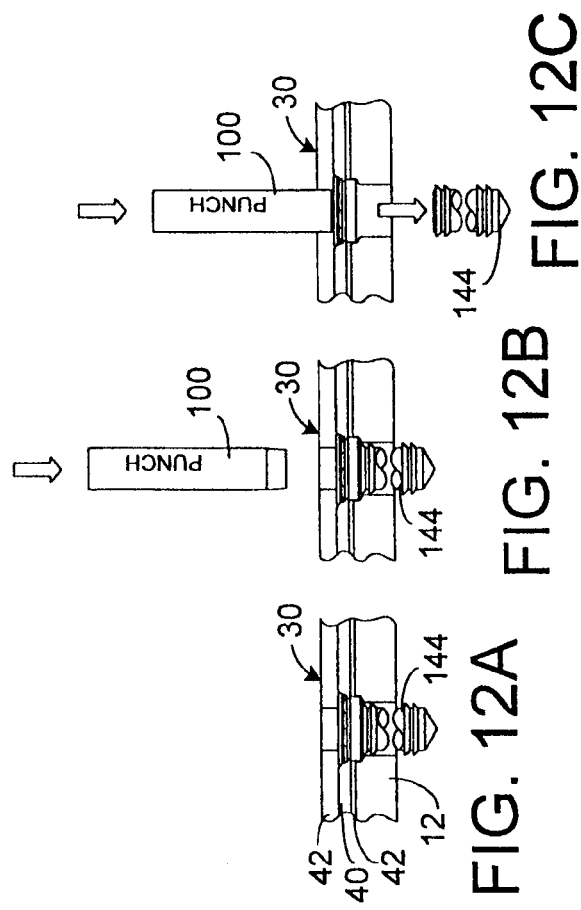
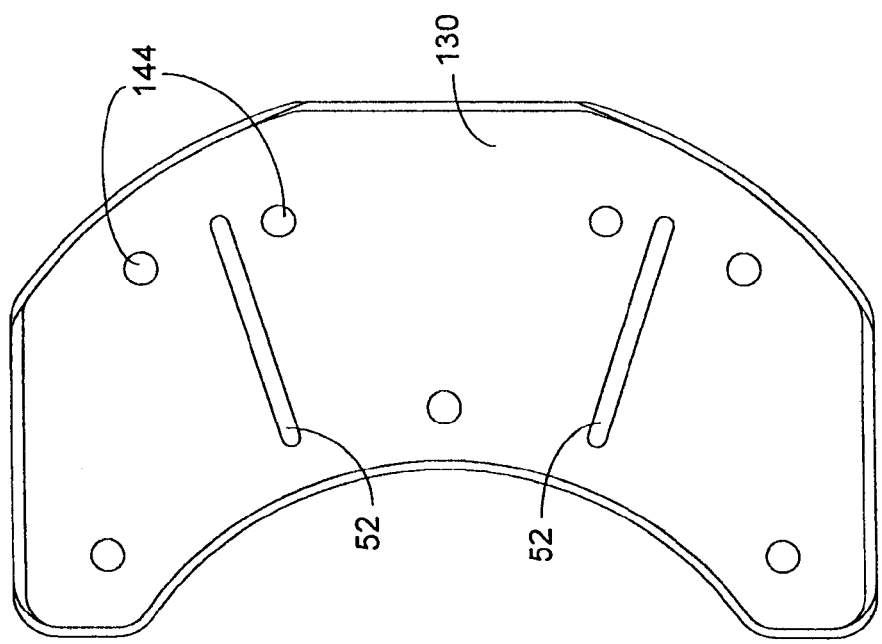

FIFTH WHEEL LUBE PLATE HAVING A PERFORATED SUPPORT MEMBER

CROSS-REFERENCE TO RELATED APPLICATIONS

This application is a continuation application of U.S. patent application Ser. No. 10/476,135, filed Jan. 8, 2004 now U.S. Pat. No. 7,036,839, which is the National Stage of International Application No. PCT/US02/12688, filed on Apr. 24, 2002, which claims priority under 35 U.S.C. §119(e) on U.S. Provisional Patent Application No. 60/286,318, filed on Apr. 25, 2001, the entire disclosures of each of these applications are incorporated herein by reference.

BACKGROUND OF THE INVENTION

The present invention generally pertains to a fifth wheel lube plate.

A common hitch for hauling large trailers is the well-known fifth wheel hitch, which has a large bifurcated bearing plate that receives a kingpin and locks it in place with one or more jaws. The kingpin is mounted on a trailer, which also has a bearing plate that rests upon and pivots on the upper surface of the hitch bearing plate to enable articulation between the trailer and its towing tractor. This pivotal action is typically aided by a layer or film of grease on the hitch surface. Because this grease is not only messy but also tends to retain dirt and dust, which cause wear, it is undesirable.

Various attempts have been made in the past to provide a lubricious surface layer for the hitch without the extensive amount of grease normally required. These efforts are believed to be largely set forth or represented by U.S. Pat. No. 5,263,856 to Huehn et al.; U.S. Pat. No. 3,174,812 to Widmer; U.S. Pat. No. 3,704,924 to Lowry; U.S. Pat. No. 3,275,390 to Franks; U.S. Pat. No. 5,066,035 to Athans et al.; U.S. Pat. No. 3,924,909 to Kent et al.; U.S. Pat. No. 4,121,853 to McKay; U.S. Pat. No. 4,169,635 to Szalay et al.; U.S. Pat. No. 4,457,531 to Hunger; U.S. Pat. No. 4,542,912 to St. Louis; U.S. Pat. No. 4,752,081 to Reeners et al.; U.S. Pat. No. 4,805,926 to Mamery; U.S. Pat. No. 6,010,141 to Huntimer et al.; U.S. Pat. No. 6,045,148 to Baumeister et al.; and U.S. Pat. Nos. 5,620,770 and 5,622,767 to Cork. Many of these designs would require total redesign of the hitch plate. Others involve fastening devices undesirably exposed on the top of the lubricious material. Some have the lubricious layer rather permanently mounted to the hitch so that replacement of a worn product is extremely difficult and costly. Structures such as that disclosed in U.S. Pat. No. 3,174,812 require special cavities in the fifth wheel and only provide a small bearing surface area considered inadequate. As a consequence of these and related shortcomings, most fifth wheel hitches in use still comprise the well-known grease-coated metal plate.

To overcome many of these problems, U.S. Pat. No. 5,522,613 issued to Heeb and commonly assigned with this application discloses a fifth wheel hitch having specially configured, interfitting lube plates mounted onto the hitch plate so as to substantially cover a maximum area of the bearing surface yet arranged to enable each lube plate to perform independently to a degree allowing localized "stick-slip" motion between the lubricious pad and the overlying trailer bearing plate. Lubricious polymer layer segments are disclosed that form replaceable segmented plates that are bonded to like configured, segmented steel backing plates. Threaded studs are stud-welded to the metal backing plates, projecting only from the bottom surface thereof with the studs extending down through orifices in the hitch plate for securing to the hitch plate by nuts. The lubricious material disclosed in U.S. Pat. No. 5,522,613 is a nylon material reinforced with embedded glass fibers or polytetrafluoroethylene embodied in a sintered matrix. The lubricious material is disclosed as being either molded onto the metal support plate and bonded in situ, or applied as a prefabricated layer and bonded to the metal support plate by an adhesive.

While nylon is a satisfactory material, it is very difficult to attach to a metal plate. Thus, structures similar to that disclosed in U.S. Pat. No. 5,522,613 have been constructed utilizing urethane, which bonds better to the metal backing plate. While such a construction works satisfactorily, it has been discovered some lubricious materials behave differently in different climates. It is desirable to utilize a material that is lubricious, economical and behaves satisfactorily in most climates.

One commercially available lube plate utilizes a relatively thick layer of fiber reinforced composite plastic. Because the lube plate utilizes only a few fasteners to hold it to the hitch plate, it has a tendency to sled around, thereby requiring a substantial pocket in the top surface of the hitch plate. This lube plate is also subject to peeling or buckling when a driver backs his tractor into the trailer and the leading edge of the trailer hits the lube plate, because the lube plate material is not very rigid and has few fasteners.

Accordingly, there is a need for a suitable lube plate construction that overcomes the problems noted above with respect to the prior art. Specifically, there is a need for a low cost lubricious sliding surface on which the trailer bolster plate articulates, that minimizes the possibility that the plastic insert may "peel" away from the top of the fifth wheel plate.

SUMMARY OF THE INVENTION

The fifth wheel hitch lube plate of the present invention comprises a perforated support member having a plurality of perforations and a lubricious material molded around the perforated support member such that the lubricious material covers both the top and bottom surfaces of the perforated support member and extends through the perforations formed in the perforated support member. Preferably, the support member is a perforated metal plate and the lubricious material is nylon, graphite, or an ultra-high molecular weight (UHMW) polyethylene material. The problems associated with utilizing nylon (or similar materials) and bonding it to a metal support plate are overcome by forming the plurality of apertures in the metal support plate so that a mechanical cohesive bond is formed between the upper and lower surfaces of the metal support plate, thereby substantially increasing the lube plate strength and shear strength, while decreasing the likelihood that the lube plate may buckle.

According to another aspect of the present invention, a fifth wheel hitch lube plate is provided that comprises a support member, a lubricious material supported by the support member, and a plurality of studs extending downward from the support member and having a plurality of deformable ribs that deform to allow easy insertion into a hole in a fifth wheel hitch plate, while resisting removal from the hole when pulled in a direction opposite the insertion direction.

According to another embodiment of the present invention, the fifth wheel hitch lube plate comprises a perforated metal support plate having a plurality of perforations, and a lubricious material molded around the perforated metal support plate. The lubricious material comprising an ultra-high molecular weight polyethylene material.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 1 is a top plan view of the hitch of the present invention utilizing a two-pad arrangement;

FIG. 2 is a bottom plan view of the hitch in FIG. 1;

FIG. 11 is a top plan view of a lube plate structure constructed in accordance with a third embodiment of the present invention, which utilizes a novel punch-through fastener;

FIGS. 12A-12C are enlarged, fragmentary, elevational, cross-sectional views showing the detachment of the lube plate shown in FIG. 11 from a hitch plate.

DESCRIPTION OF THE PREFERRED EMBODIMENTS

Figures 3, 4:
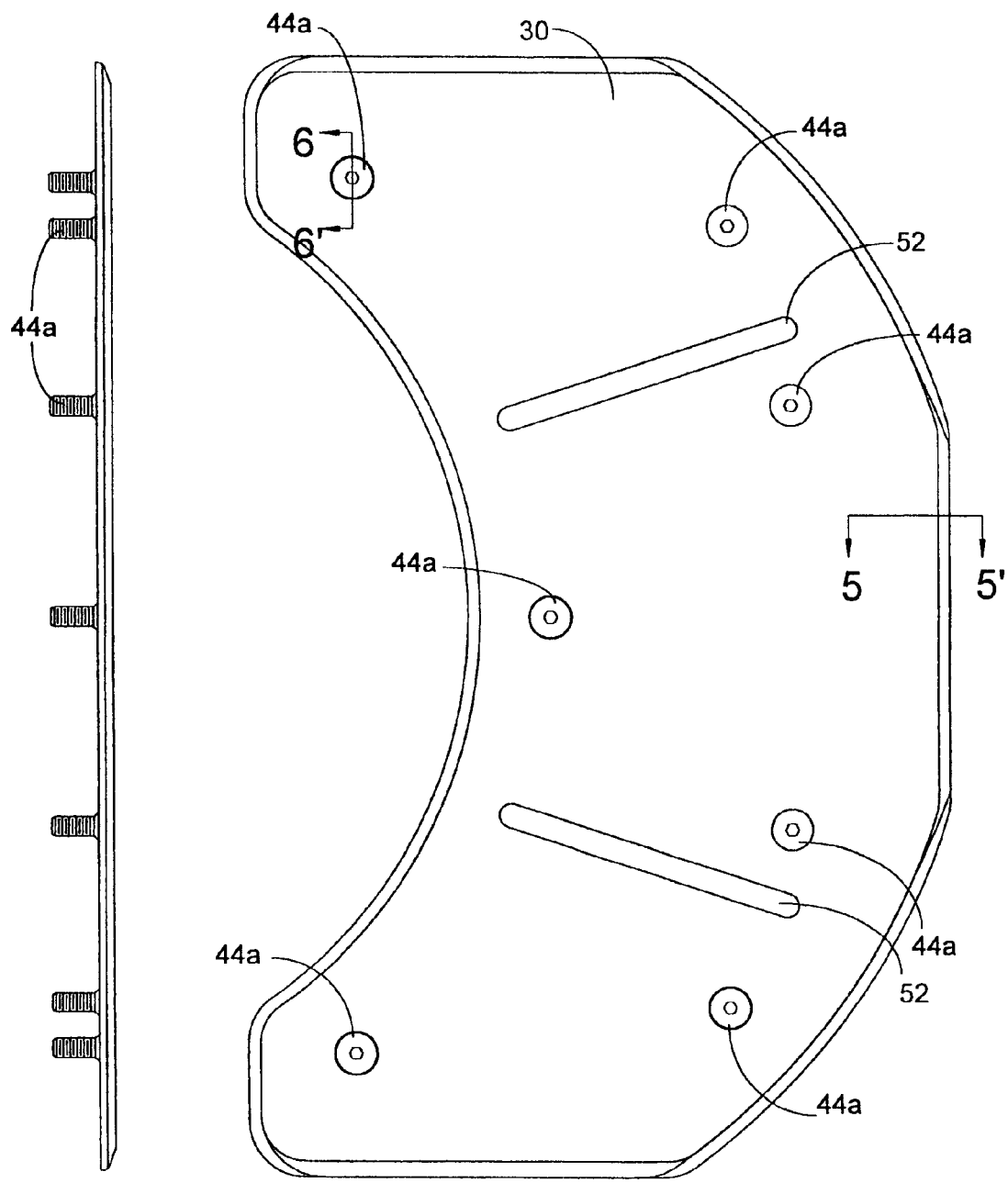
FIG. 3 is a top plan view of a lube plate constructed in accordance with a first embodiment of the present invention, which utilizes a through-hole fastener such as a screw.
FIG. 4 is a side elevational view of the lube plate shown in FIG. 3.

Referring now specifically to the drawings, the fifth wheel hitch assembly 10 depicted in FIGS. 1, 2, 9, and 10 comprises a fifth wheel hitch plate 12 having a bifurcated rear portion which forms laterally spaced ramps 14 astraddle a kingpin receiving mouth 16 and throat 18. In the hitch shown, a jaw 19 is mounted on a pivot pin 20 to pivot thereon and lock a conventional depending kingpin (not shown) on a trailer within throat 18 until purposely released. This hitch has an upstanding peripheral rim 12' extending around both sides and the forward end of the hitch, defining a pocket 12" (FIG. 9) in the top of the hitch plate. A lower, transverse reinforcing beam 20a extends across the mouth 16 below the level of the entering kingpin in conventional fashion. The opposite sides of plate 12 are mounted on bearing trunnions 22 in conventional fashion to pivot forwardly and rearwardly on a transverse pivot axis. Hitch plate 12 has an overall pattern of orifices 24 (FIG. 9) extending through the thickness of the plate.

Shown in FIG. 1 to be mounted on hitch plate 12 are specially configured and cooperative lube plates 30 disposed on opposite lateral sides of the mouth and throat of the hitch plate. The two lube plates 30 are basically in mirror-image relationship, having the same arcuate curvilinear configuration which arcs around the mouth and throat area and radially extends to the outer edge of pocket 12", i.e., out to rim 12'. The pocket and the two lube plates cover a substantial portion of the fifth wheel hitch plate.

As best shown in FIGS. 3-8, each of the lube plates 30 depicted includes a perforated support member 40 having an upper surface and a lower surface. Molded around support member 40 is a lubricious material 42. Support member 40 is preferably a perforated steel plate of rolled steel having a thickness within the range of about 0.030 to 0.125 inch. The support member 40 includes a plurality of circular perforations 50 defining apertures extending between the upper and lower surface of member 40.

Figure 5:
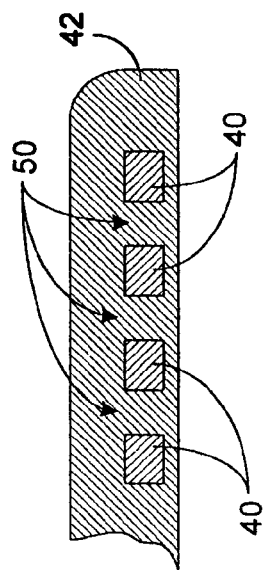
FIG. 5 is an enlarged fragmentary, elevational, cross-sectional view of the lube plate shown in FIG. 3 taken along line 5-5'.
Figure 6:
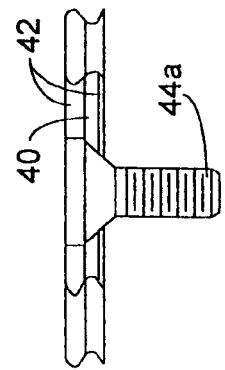
FIG. 6 is an enlarged fragmentary, elevational, cross-sectional view of the lube plate shown in FIG. 3 taken along line 6-6' showing the through-hole fastener.
Figures 7, 8:
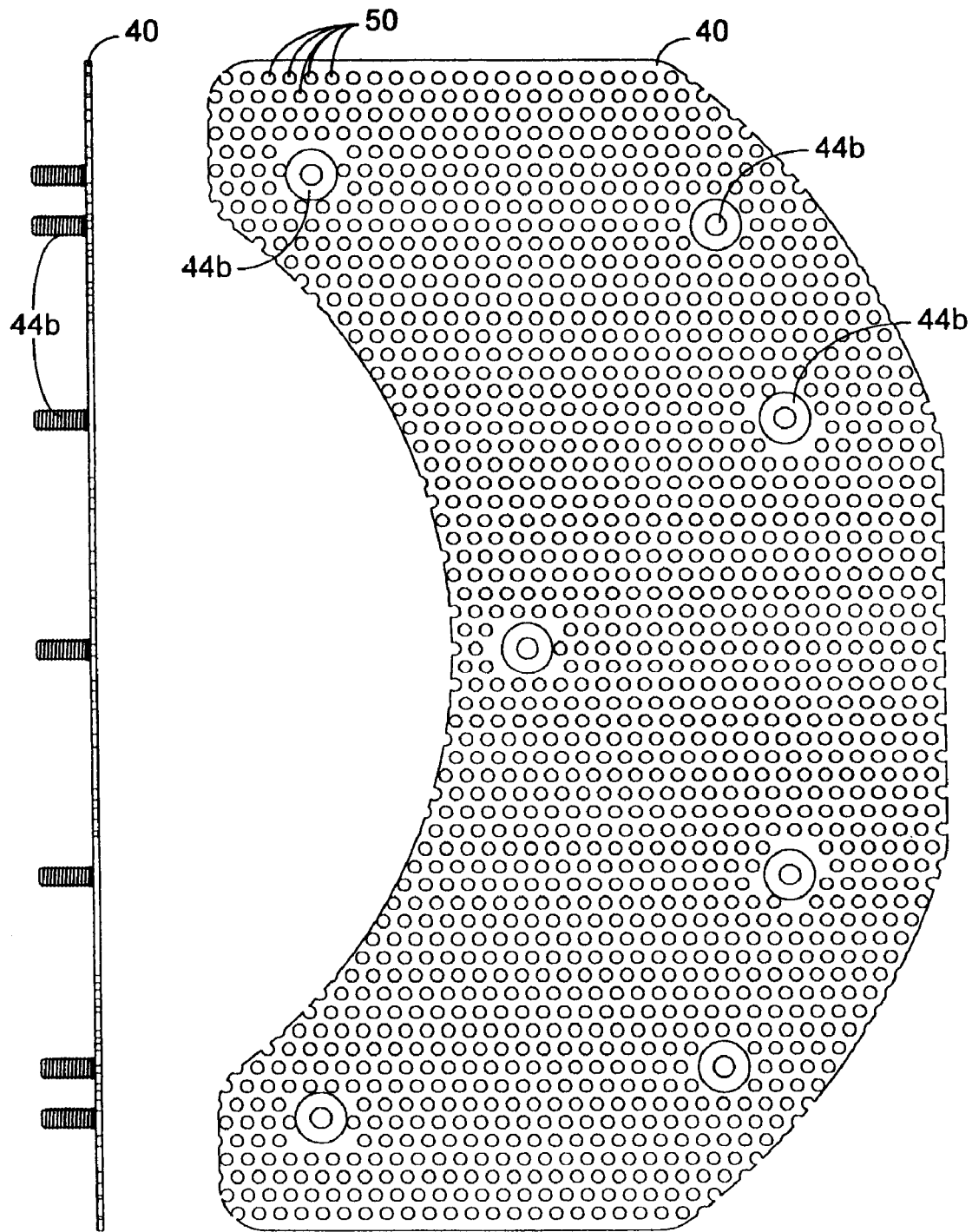
FIG. 7 is a top plan view of a perforated metal support member used in the lube plate of a second embodiment of the present invention, which utilizes studs.
FIG. 8 is a side elevational view of the perforated metal support member shown in FIG. 7.

In the structure shown in FIGS. 5 and 7, perforations 50 are formed throughout the surface area of support member 40 with the exception of regions surrounding that from which a stud 44 extends. The radial minimum distance from the center of the stud to the edge of the perforations 50 formed in support member 40 and the size, number, and spacing of the perforations depend upon the lubricious material used and the metal backing plate material used and their strength characteristics. Perforations 50 are preferably sufficiently small to ensure the structural integrity of support member 40 while being sufficiently numerous to allow good mechanical bonding between the layers of material 42 on the upper and lower surfaces of support member 40.

The lubricious material 42 may be formed of nylon, graphite, ultrahigh molecular weight (UHMW) polyethylene, or any other suitable anti-friction material. Most preferably, lubricious material 42 is modified nylon with an ultraviolet protectant stabilizer or UHMW polyethylene. The nylon may be formed about support member 40 by injection molding. If UHMW polyethylene is utilized, the material may be molded onto support member 40 by compression molding.

In a preferred embodiment, the thickness of the lubricious material that extends below support member 40 is less than the thickness of the material above the upper surface of support member 40. As shown in FIG. 3, the edges of plate 30 are preferably beveled and a pair of grooves 52 is formed in the upper surface to aid in the collection of debris that may otherwise collect between the upper surface of lube plate 30 and the bearing plate on the trailer.

Preferably, the lube plate 30 is formed slightly convex towards its upper surface. This allows a thinner support member 40 to be utilized while retaining the strength of the lube plate 30. Thus, the overall thickness of the lube plate may be reduced, which may allow for the elimination of the pocket 12" (FIG. 9) in the hitch plate 12. The perforated metal plate may be made thicker than the prior art non-perforated metal plate without added extra weight. Thus, the perforated plate of the present invention adds to the strength of the lube plate without adding extra weight. The inventive lube plate is also less likely to curl up, and the lubricious material is less likely to be torn off the support member. The perforated plate also spreads out the force of impact over a larger area on the hitch plate thus allowing the use of fewer attachments to the hitch plate.

According to the first embodiment shown in FIGS. 3-6, the lube plates may be attached to the fifth wheel hitch plate using through-hole fasteners such as the tapered screws 44a shown in FIGS. 3-6.

Figure 10:
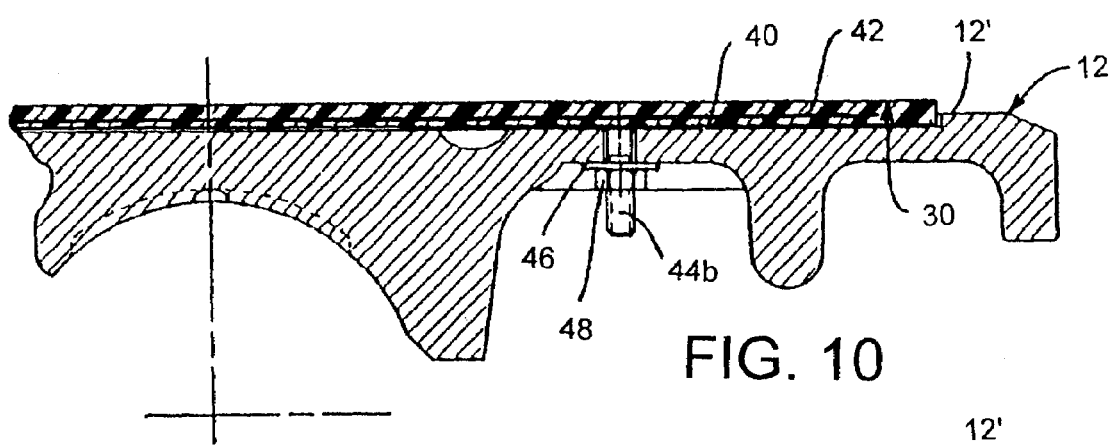
FIG. 10 is an enlarged, fragmentary, elevational, cross-sectional view comparable to FIG. 9, but with the lube plate structure of the second embodiment mounted thereon.
Figure 9:
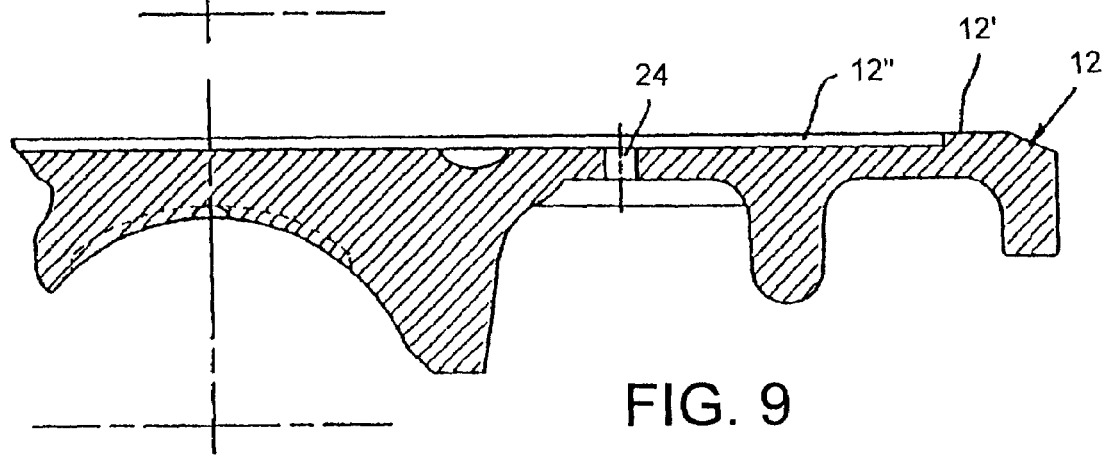
FIG. 9 is an enlarged fragmentary, elevational, cross-sectional view of the hitch shown in FIGS. 1 and 2.

According to a second embodiment shown in FIGS. 7, 8, and 10, a plurality of threaded studs 44b are stud-welded at their upper ends to the bottom surface of support member 40 as shown in FIGS. 8 and 10 or are pressed into the support plate with their heads flush with the top of the support plate. These studs are positioned in a pattern on the individual support members corresponding to portions of the overall pattern of orifices 24 in support member 12 to enable the studs to project down through the hitch plate for securing by a washer 46 and nut 48 on each stud (see FIGS. 2 and 10).

The two lube plates require only one mold configuration to form them since the lube plates 30 are simply the inverted forms of each other and those one part may be used for the right and left lube plates. Alternatively, the right and left lube plates may be different from one another.

Mounting of the lube plates is simple, namely placing the two plates in position with the studs 44 extending down through the openings and fastening the nuts 48 in position to retain them on the hitch plate. Replacement of the lube plates, either individually or collectively, is also easy to accomplish by removing nuts 48 from studs 44b, lifting any worn pad subassemblies from the hitch plate, and replacing them with new ones.

The peripheral rim 12' enables the lube plates and rim to withstand excessive vertical downward loads, excessive shear loads, and/or torsional loads, yet each lube plate is able to perform independently in the surface-to-surface relationship with the overlying trailer bearing plate to a degree enabling localized "stick-slip" motion characteristics of friction relationship between the polymer of the lube plate surface and the metal of the overlying trailer bearing plate.

According to a third, alternative embodiment shown in FIGS. 11 and 12A-12C, studs 144 are utilized that have "one-way" flexible rings or tabs that bend when inserted into a hole in the hitch plate and resist movement in the opposite direction by biting into the sides of the hole. This allows the lube plates 130 to be installed from the top of the hitch plate without requiring removal of the hitch plate from the hitch mounting brackets and without need for nuts and washers to be attached at the bottom of the hitch plate. To remove the lube plates 130 from the hitch plate, one may use a punch 100 to punch out the studs from the top side of the lube and hitch plates once again eliminating the need to remove to the hitch plate from its mounting brackets as would be required to remove any nuts and washers. These novel studs may be used with any lube plate construction whether perforated or non-perforated.

Figure 13:
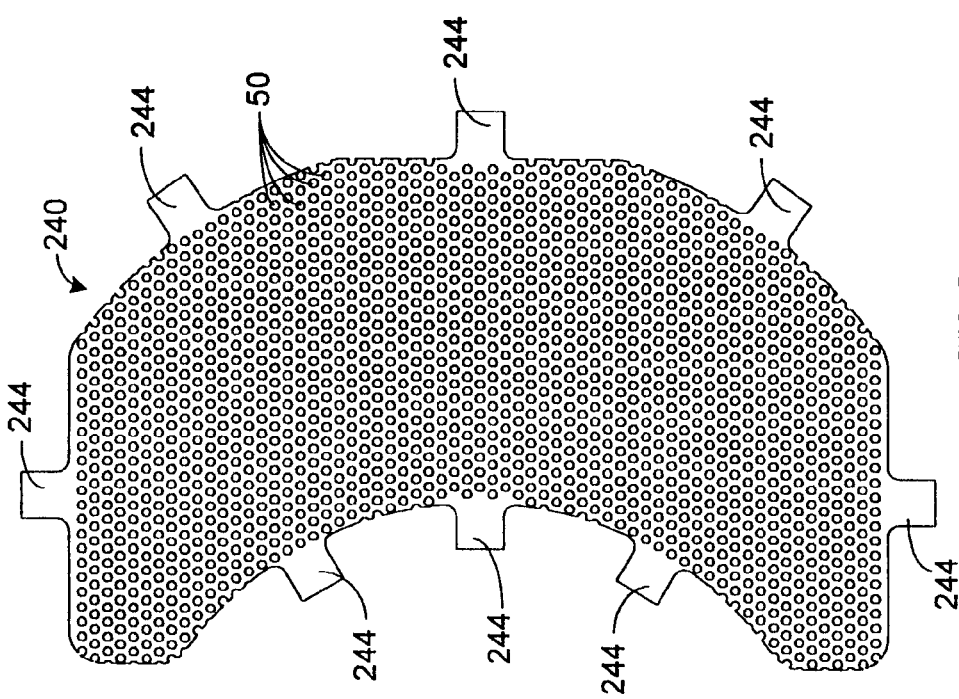
FIG. 13 is top plan view of a perforated support member constructed in accordance with a fourth embodiment of the present invention, which utilizes weld tabs.

According to a fourth embodiment shown in FIG. 13, support member 240 may include a plurality of tabs 244 that may be welded or otherwise secured onto the hitch plate.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A lube plate for attachment to a hitch plate of a fifth wheel hitch, said lube plate comprising:
    a perforated metal support plate having a plurality of perforations, said perforated metal support plate being substantially flat and configured for attachment to the hitch plate of the fifth wheel hitch; and
    a lubricious material molded onto said perforated metal support plate, said lubricious material comprising an ultra-high molecular weight polyethylene material;
    wherein said lubricious material is molded around said perforated metal support plate such that said lubricious material covers both the top and bottom surfaces of said perforated metal support plate, and extends through at least one of said perforations formed in said perforated metal support plate.

2. The fifth wheel hitch lube plate of claim 1, wherein said lubricious material is molded around said perforated metal support plate such that said lubricious material extends through a plurality of said perforations formed in said perforated metal support plate.

3. The fifth wheel hitch lube plate of claim 1, wherein said perforated metal support plate is made of steel.

4. The fifth wheel hitch lube plate of claim 1, wherein said metal support plate has a thickness within the range of about 0.030 to 0.125 inch.

5. A lube plate for attachment to a hitch plate of a fifth wheel hitch, said lube plate comprising:
    a perforated metal support plate having a plurality of perforations, said perforated metal support plate being configured for attachment to the hitch plate of the fifth wheel hitch; and
    a lubricious material molded onto said perforated metal support plate, said lubricious material comprising an ultra-high molecular weight polyethylene material, wherein said perforated metal support plate being configured for attachment to the hitch plate of the fifth wheel hitch by including a plurality of studs extending from said perforated metal support plate.

6. A lube plate for attachment to a hitch plate of a fifth wheel hitch, said lube plate comprising:
    a perforated metal support plate having a plurality of perforations, said perforated metal support plate being configured for attachment to the hitch plate of the fifth wheel hitch; and
    a lubricious material molded onto said perforated metal support plate, said lubricious material comprising an ultra-high molecular weight polyethylene material, wherein said perforated metal support plate being configured for attachment to the hitch plate of the fifth wheel hitch by including a plurality of welding tabs extending from said perforated metal support plate.

7. A fifth wheel hitch comprising:
    a hitch plate for pivotable attachment to a vehicle;
    a perforated metal support plate having a plurality of perforations, said perforated metal support plate being attached to said hitch plate; and
    a lubricious material molded around said perforated metal support plate, said lubricious material comprising an ultra-high molecular weight polyethylene material.

8. The fifth wheel hitch of claim 7, wherein said lubricious material is molded around said perforated metal support plate such that said lubricious material covers the top surface of said perforated metal support plate and extends through at least one of said perforations formed in said perforated metal support plate.

9. The fifth wheel hitch of claim 8, wherein said lubricious material is molded around said perforated metal support plate such that said lubricious material covers both the top and bottom surfaces of said perforated metal support plate.

10. The fifth wheel hitch of claim 9, wherein said lubricious material is molded around said perforated metal support plate such that said lubricious material extends through a plurality of said perforations formed in said perforated metal support plate.

11. The fifth wheel hitch of claim 7, wherein said perforated metal support plate is made of steel.

* * * * *